J. H. Stone.
Tea & Coffee-Pots.
Nº 75706.  Patented Mar. 17, 1868.
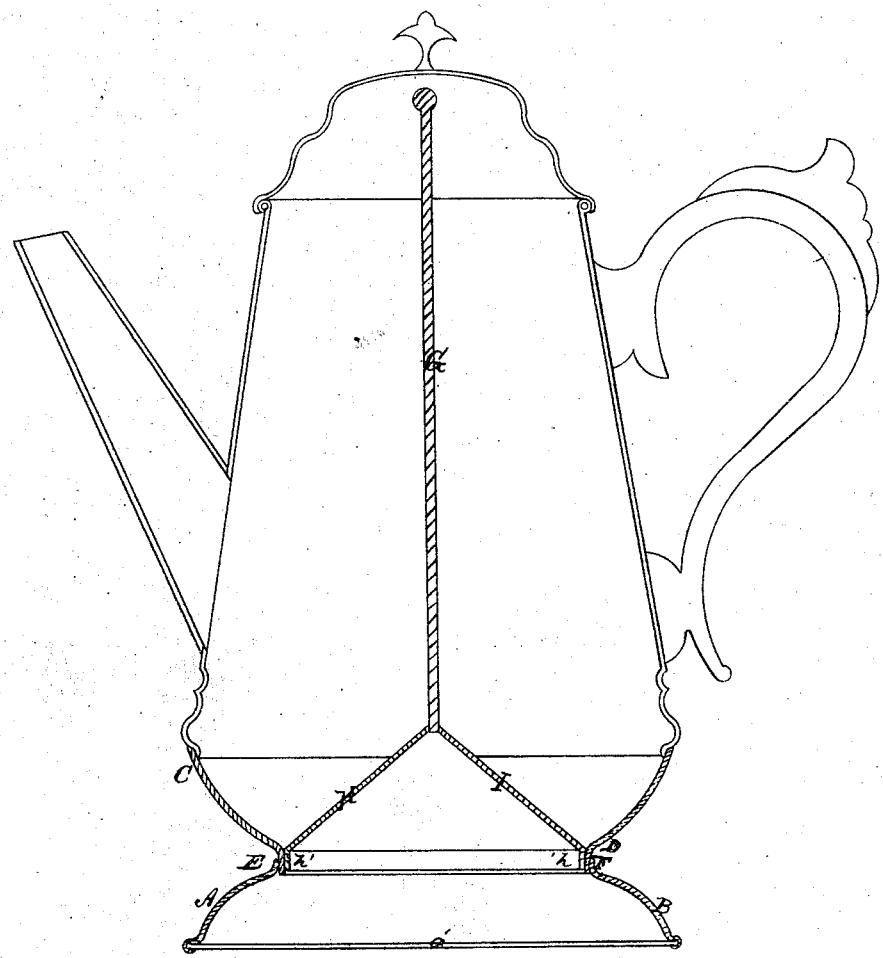
Witnesses:
Benj. Morrison
Wm. H. Morison
Inventor.
J. H. Stone

United States Patent Office.

JOHN H. STONE, OF PHILADELPHIA, PENNSYLVANIA.

Letters Patent No. 75,706, dated March 17, 1868.

IMPROVEMENT IN THE CONSTRUCTION OF SHEET-METAL TEA AND COFFEE-POTS.

*The Schedule referred to in these Letters Patent and making part of the same.*

TO ALL WHOM IT MAY CONCERN:

Be it known that I, JOHN H. STONE, of the city of Philadelphia, in the State of Pennsylvania, have invented a new and useful Improvement in the Manufacture of Sheet-Metal Tea and Coffee-Pots; and I do hereby declare that the following is a full, clear, and exact description of the same, reference being had to the accompanying drawing, making a part of this specification, and to the letters of reference marked thereon.

The object of my improvement is to produce a sheet-metal tea and coffee-pot, having its body and base connected by a narrow or recessed portion, in imitation of the "Britannia" and other cast-metal tea and coffee-pots for table use; and also to afford a more simple and appropriate device for straining the tea or coffee in the vessel.

My invention consists in making the base and the lower portion of the body, with the recessed portion between them, of two annular plates of the sheet metal, (generally tin-plate,) stamped or "formed up" by suitable dies, and connected together at their smaller ends, substantially in the manner hereinafter described and shown; and my invention also consists in, in combination with a tea and coffee-pot having the recessed portion described above, the employment of an adjustable strainer, constructed and applied thereto, as hereinafter described and shown.

Referring to the drawing, (which is a central vertical section of the improved pot,) A B is the base, C D the bottom of the body, E F the recessed or contracted portion between the said base and body, and G H I the adjustable strainer as applied.

The base, A B, and the bottom, C D, of the body, are each stamped or "formed up" between suitable dies, (operating in the well-known manner,) out of a flat disk of tin-plate or other sheet metal, (cut or punched out in its middle, so as to leave an opening,) and then adjusted together, by inserting the smaller open end of the part C D into the smaller open end of the part A B, and soldering them together water-tight, between the laps, as indicated in the drawing.

The strainer G H I consists of a hollow conical strainer, H I, made of perforated sheet metal or gauze wire, having a vertical flange, $h'$, at its lower edge, which is adapted, in its construction, to slip easily within the recessed portion E F, and a stem, G, which reaches up into the under side of the concave lid of the pot, and serves as a handle for adjusting, and also as a means of keeping the strainer in place when the lid of the pot is closed down, as shown in the drawing.

When tea or ground coffee is to be put into the pot, the strainer G H I is to be first withdrawn, for the purpose of allowing the tea or coffee to fall into the base, A B, after which the strainer is to be reinserted, as shown in the drawing; and during the operation of the boiling, the tea or coffee will remain confined below the said strainer, yet with ample room to be agitated therein, and the strength thoroughly extracted by the boiling of the water, which will, in consequence, be continually passing into and out of the base.

This mode of constructing and applying a strainer is inexpensive and effective, and can be kept clean with facility; and the mode described, of producing the contracted or recessed portion E F, between the base and body of a sheet-metal pot, is important, because it enables the manufacturer to produce an article of the kind, not only as merchantable as those cast of Britannia metal, but one capable of enduring the boiling heat of a stove or range, without injury.

Having thus fully described my improvement, what I claim as new, and desire to secure by Letters Patent, is confined to the following, viz:

I claim a sheet-metal tea or coffee-pot, having the lower end, C D, of its body, and the upper side of its base, A B, formed up, and connected together at their smaller ends, so as to produce the said bottom and base, with the recessed portion E F between them, as and for the purpose described.

I also claim, in combination with the subject-matter of the preceding claim, the strainer G H I, constructed and applied substantially as described and set forth.

J. H. STONE.

Witnesses:
BENJ. MORISON,
JOHN WHITE.